(12) United States Patent
Springer

(10) Patent No.: US 12,314,530 B2
(45) Date of Patent: May 27, 2025

(54) DEVICE FOR DISPLAYING THE WEATHER ON DEMAND

(71) Applicant: The Swatch Group Research and Development Ltd, Marin (CH)

(72) Inventor: Simon Springer, Berne (CH)

(73) Assignee: The Swatch Group Research and Development Ltd, Marin (CH)

( * ) Notice: Subject to any disclaimer, the term of this patent is extended or adjusted under 35 U.S.C. 154(b) by 457 days.

(21) Appl. No.: 17/651,097

(22) Filed: Feb. 15, 2022

(65) Prior Publication Data

US 2022/0269393 A1    Aug. 25, 2022

(30) Foreign Application Priority Data

Feb. 24, 2021  (EP) ..................................... 21159045

(51) Int. Cl.

| | | |
|---|---|---|
| *G06F 3/04817* | (2022.01) | |
| *G01W 1/02* | (2006.01) | |
| *G04B 47/06* | (2006.01) | |
| *G04G 9/10* | (2006.01) | |
| *G04G 21/02* | (2010.01) | |
| *H04W 4/029* | (2018.01) | |

(52) U.S. Cl.
CPC ........... *G06F 3/04817* (2013.01); *G01W 1/02* (2013.01); *G04B 47/06* (2013.01); *G04G 9/107* (2013.01); *G04G 21/02* (2013.01); *H04W 4/029* (2018.02)

(58) Field of Classification Search
CPC ...... G06F 3/04817; G04B 47/06; G04G 21/02
See application file for complete search history.

(56) References Cited

U.S. PATENT DOCUMENTS

| | | | | |
|---|---|---|---|---|
| 3,623,251 A | * | 11/1971 | Bosch ..................... | A63H 33/22 40/455 |
| 5,500,835 A | * | 3/1996 | Born ....................... | G04C 3/146 368/11 |
| 5,631,878 A | * | 5/1997 | Chen ...................... | G04B 19/223 368/21 |
| 6,754,137 B1 | * | 6/2004 | Bourquin ............... | G04G 21/02 368/10 |
| 9,891,589 B2 | * | 2/2018 | Leigh-Bramwell .... | G04B 47/06 |
| 10,705,486 B2 | * | 7/2020 | Aboutalebi ............ | G01N 33/49 |

(Continued)

FOREIGN PATENT DOCUMENTS

| | | |
|---|---|---|
| CN | 1318160 A | 10/2001 |
| CN | 1353827 A | 6/2002 |

(Continued)

OTHER PUBLICATIONS

Japanese Office Action issued Jan. 17, 2023 in Japanese Patent Application No. 2022-021007 (with English Translation), 9 pages.

(Continued)

*Primary Examiner* — Edwin A. Leon
*Assistant Examiner* — Sean R Brannon
(74) *Attorney, Agent, or Firm* — Oblon, McClelland, Maier & Neustadt, L.L.P.

(57) ABSTRACT

A display device for displaying the weather on demand. The display device includes a first indicator member mobile and having a representation of the sun. This representation of the sun is totally or partially concealed by a concealing element that is located on a second mobile indicator member when the user requests it and in particular via a control unit.

14 Claims, 4 Drawing Sheets

(56) References Cited

U.S. PATENT DOCUMENTS

| | | | |
|---|---|---|---|
| 2017/0038735 A1 | 2/2017 | Leigh-Bramwell et al. | |
| 2020/0089381 A1* | 3/2020 | Ji | H04M 1/72451 |
| 2020/0125033 A1* | 4/2020 | Lagorgette | G04G 21/04 |
| 2020/0218200 A1* | 7/2020 | Sauzay | G04B 19/262 |
| 2020/0249771 A1* | 8/2020 | Kim | G04G 9/007 |

FOREIGN PATENT DOCUMENTS

| | | |
|---|---|---|
| CN | 106796413 A | 5/2017 |
| CN | 111090230 A | 5/2020 |
| CN | 211979431 U | 11/2020 |
| DE | 197 20 591 A1 | 11/1998 |
| EP | 2 204 702 A1 | 7/2010 |
| EP | 3 158 404 A2 | 4/2017 |
| JP | 9-257954 A | 10/1997 |
| JP | 2017-518491 A | 7/2017 |
| JP | 2018-112503 A | 7/2018 |
| WO | WO 2015/193665 A2 | 12/2015 |
| WO | WO 2015/193665 A3 | 12/2015 |

OTHER PUBLICATIONS

European Search Report issued Jul. 6, 2021 in European Application 21159045.0, filed on Feb. 24, 2021, 3 pages (with English Translation of Categories of cited documents).

Combined Chinese Office Action and Search Report issued Jun. 21, 2024, in corresponding Chinese Patent Application No. 202210171086.9 (with English Translation of Category of Cited Documents), 11 pages.

\* cited by examiner

Fig. 3
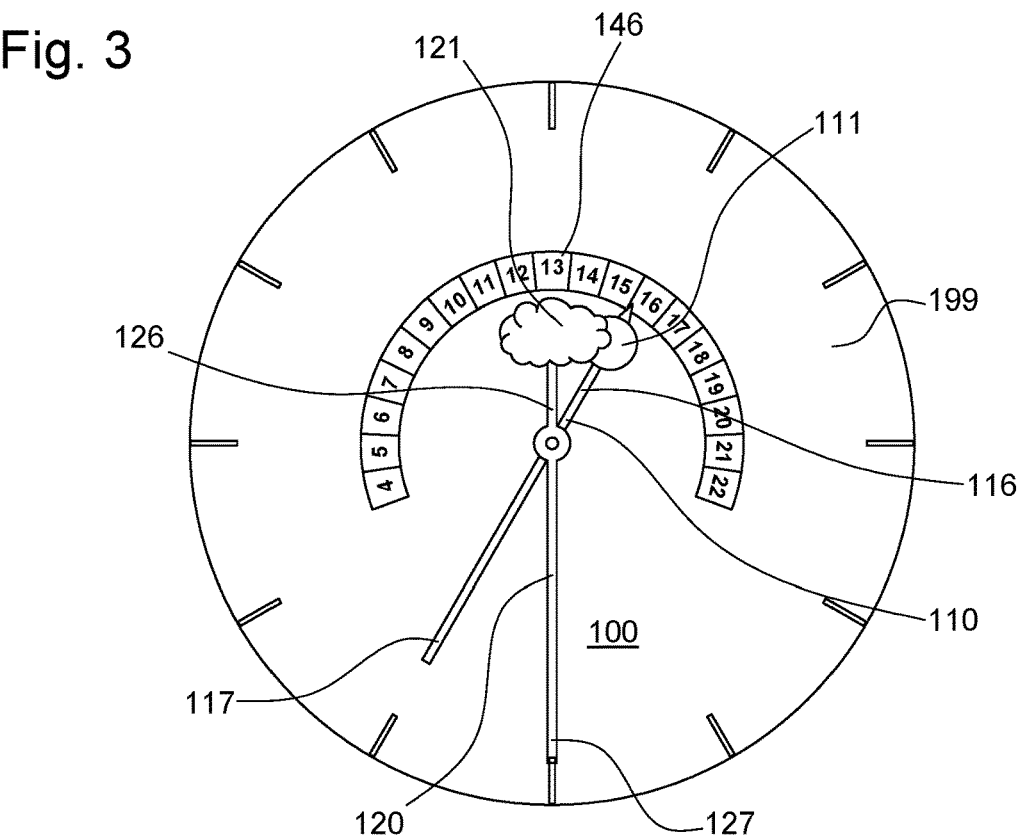
Fig. 4A
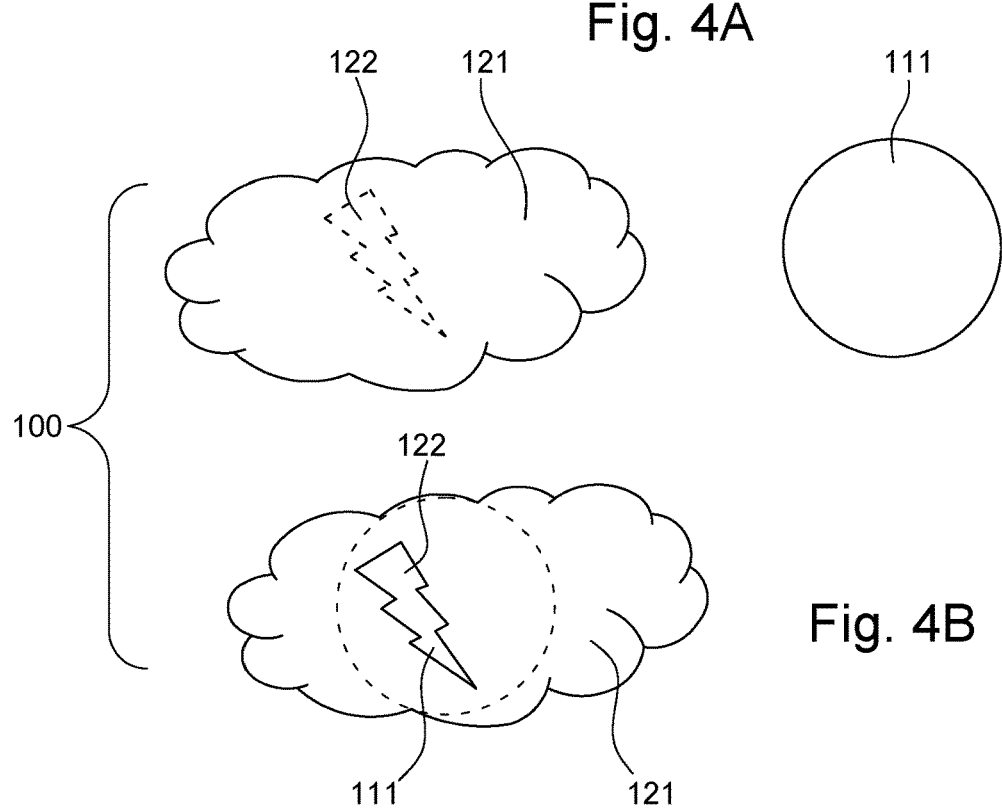
Fig. 4B

DEVICE FOR DISPLAYING THE WEATHER ON DEMAND

CROSS-REFERENCE TO RELATED APPLICATION

This application claims priority to European Patent Application No. 21159045.0 filed Feb. 24, 2021, the entire disclosure of which is hereby incorporated herein by reference.

TECHNICAL FIELD

The present application relates to the field of horology and more particularly the representation of the weather. Preferably, the present invention relates to a representation of the weather according to certain parameters and/or at the request of the user.

TECHNOLOGICAL BACKGROUND

Most weather representations are present on screens of smartwatches having a digital display. This representation, however, consumes a significant portion of the energy of the smartwatch and of the space available on the screen with regard to the refresh frequency of the information.

SUMMARY OF THE INVENTION

The present invention aims to resolve all or a part of these disadvantages via a display device for a timepiece and preferably on demand; said display device comprising at least:
one first indicator member: said at least one first indicator member preferably being movably mounted and including at least one representation of the sun;
one second indicator member: said at least one second indicator member, preferably being movably mounted and, including at least one concealing element configured to conceal said at least one representation of the sun;
one first carrier: said at least one first carrier configured to drive said at least one first indicator member and/or said at least one second indicator member; and,
one control unit: said at least one control unit being configured to control, according to a set of data, said at least one first carrier so as to drive and/or to superimpose said at least one first indicator member and/or said at least one second indicator member in such a way that said at least one representation of the sun is totally or partially concealed by said at least one concealing element.

Via this arrangement, the weather forecasts are represented without a space on the dial being specially dedicated to them, and moreover, the display device allows the user to have a dynamic representation of the weather and in the most accurate manner.

According to one embodiment, said at least one control unit controls said at least one first carrier at the request of the user.

Via this arrangement, the weather forecasts are represented to the user in the most accurate manner according to the moment at which the user requested it.

According to one embodiment, said set of data includes at least:
a piece of weather data;
a date;
a time; and/or
a geographic position.

Via this arrangement, the weather forecasts are represented to the user in the most accurate manner according to a moment and/or a location at the request of the user.

According to one embodiment, said set of data is received by said at least one control unit via radio frequencies, via a global positioning system, and/or via wired and/or optical communication.

Via this arrangement, the weather forecasts are represented to the user in the most accurate manner according to the moment and/or the location at which the user requested it.

According to one embodiment, said display device comprises at least one second carrier configured to drive said at least one second indicator member.

Via this arrangement, said at least one first carrier and said at least one second carrier can move said at least one first indicator member and said at least one second indicator member independently.

According to one embodiment, said at least one representation of the sun is lighter that said at least one concealing element and/or said at least one concealing element and/or said at least one representation of the sun has or have a shape that is rounded, round, elliptical, a disc and/or spherical.

According to one embodiment, said at least one concealing element is darker than said at least one representation of the sun.

Via one or the other of these preceding arrangements, said at least one representation of the sun is closer to the reality.

According to one embodiment, said at least one concealing element comprises at least one opening, preferably in the shape of a lightning bolt, configured to let said at least one representation of the sun partially appear.

Via this arrangement, it is possible to represent stormy weather.

According to one embodiment, said at least one concealing element is more photoabsorbent than said at least one representation of the sun and/or said at least one representation of the sun is substantially more reflective than said at least one concealing element.

Via this arrangement, said at least one representation of the sun reflects or diffuses light in the manner of the weather and/or said at least one concealing element absorbs light.

According to one embodiment, said at least one control unit is configured to control said at least one first carrier so as to drive said at least one first indicator member totally or partially below said at least one second indicator member in such a way that said at least one representation of the sun is totally or partially concealed by said at least one concealing element, or drive said at least one second indicator member totally or partially above said at least one first indicator member in such a way that said at least one representation of the sun is totally or partially concealed by said at least one concealing element.

Via this arrangement, the weather forecasts are represented without a space on the dial being specially dedicated to them, and moreover, the display device allows the user to have a dynamic representation of the weather and in the most accurate manner.

According to one embodiment, said at least one first indicator member is mobile about a first axis of rotation and comprises a first proximal end close to said first axis of rotation and/or a first distal end distant from said first axis of rotation, and/or wherein said at least one second indicator member is mobile about a second axis of rotation and comprises a second proximal end close to said second axis of rotation and/or a second distal end distant from said second axis of rotation; said at least one representation of the sun being at said first distal end or at said first proximal end and/or said at least one concealing element being at said second distal end or at said second proximal end.

Via this arrangement, the weather forecasts are represented at the end of said or at the ends of said at least one first indicator member and/or at least one second indicator member.

According to one embodiment, said at least one first indicator member is configured to indicate the position of the sun with respect to the horizon.

Via this arrangement, the user knows the position of the sun in the sky at the moment at which the request is made.

According to one embodiment, said at least one first indicator member is configured to indicate the position of the sun with respect to the cardinal points.

Via this arrangement, the user knows the position of the sun in the sky at the moment at which the request is made.

According to one embodiment, said at least one first indicator member is the hour hand or the minute hand and/or said at least one second indicator member is the minute hand or the hour hand.

Via this arrangement, the weather forecasts are represented without a space on the dial being specially dedicated to them, while using elements already present.

According to one embodiment, said display device comprises a second hand 130 indicating the line of the horizon and being driven by said at least one first carrier, said at least one second carrier and/or at least one third carrier.

Via this arrangement, the weather forecasts are represented without a space on the dial being specially dedicated to them, while using elements already present.

According to one embodiment, the display device comprises an aperture configured to indicate said current date and/or said date of the weather indicated when the user requests it.

According to one embodiment, said current date and/or said date of the weather is indicated when the user requests it.

According to one embodiment, the display device comprises an aperture configured to indicate said day of the week and/or said day of the weather indicated when the user requests it.

According to one embodiment, said day of the week and/or said day of the weather is indicated when the user requests it.

The present invention aims to overcome all or a part of the aforementioned disadvantages via a method for displaying at least one weather forecast implemented by at least one display device according to an embodiment of the present invention, after reception of a set of data; said display method comprising at least one:

Control of said at least one first carrier and/or of said at least one second carrier by said at least one control unit; and Driving of said at least one first indicator member and/or of said at least one second indicator member so as to display a weather forecast.

Via this arrangement, the weather forecasts are represented without a space on the dial being specially dedicated to them, and moreover, the display device allows the user to have a dynamic representation of the weather and in the most accurate manner.

According to one embodiment, said display method comprises at least one incrementation of said date after each said at least one control and driving so as to display an hourly, daily and/or weekly weather forecast.

BRIEF DESCRIPTION OF THE DRAWINGS

The invention is described below in a more detailed manner using the appended drawings, given as examples that are in no way limiting, in which:

FIGS. 2 and 3 present a relative position of said at least one representation of the sun 111 and at least one concealing element 121 according to certain parameters and/or at the request of the user, according to embodiments of the invention;

FIGS. 4A and 4B disclose an embodiment of the invention; and

DETAILED DESCRIPTION OF THE INVENTION

There are various watches on the market. Most smartwatches propose a weather forecast on a digital display. However, this forecast is displayed a large part of the time whereas the user only refers to it several times, which leads to a disproportionate consumption and a reduction of the usable display zone.

Figure 1:
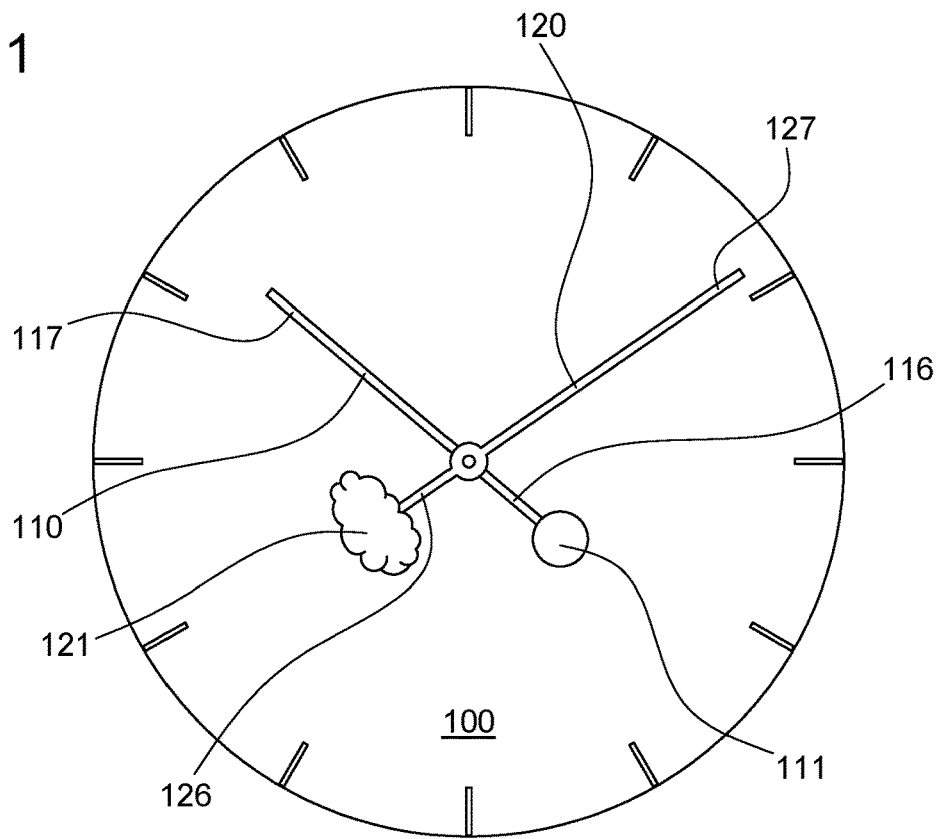
FIG. 1 illustrates at least one representation of the sun 111 and at least one concealing element 121 according to an embodiment of the invention.

To do this, the present invention, shown in FIG. 1, proposes a display device 100 for a timepiece and preferably on demand. Said display device 100 comprises at least one first indicator member 110, at least one second indicator member 120, at least one first carrier and at least one control unit.

Figure 2:
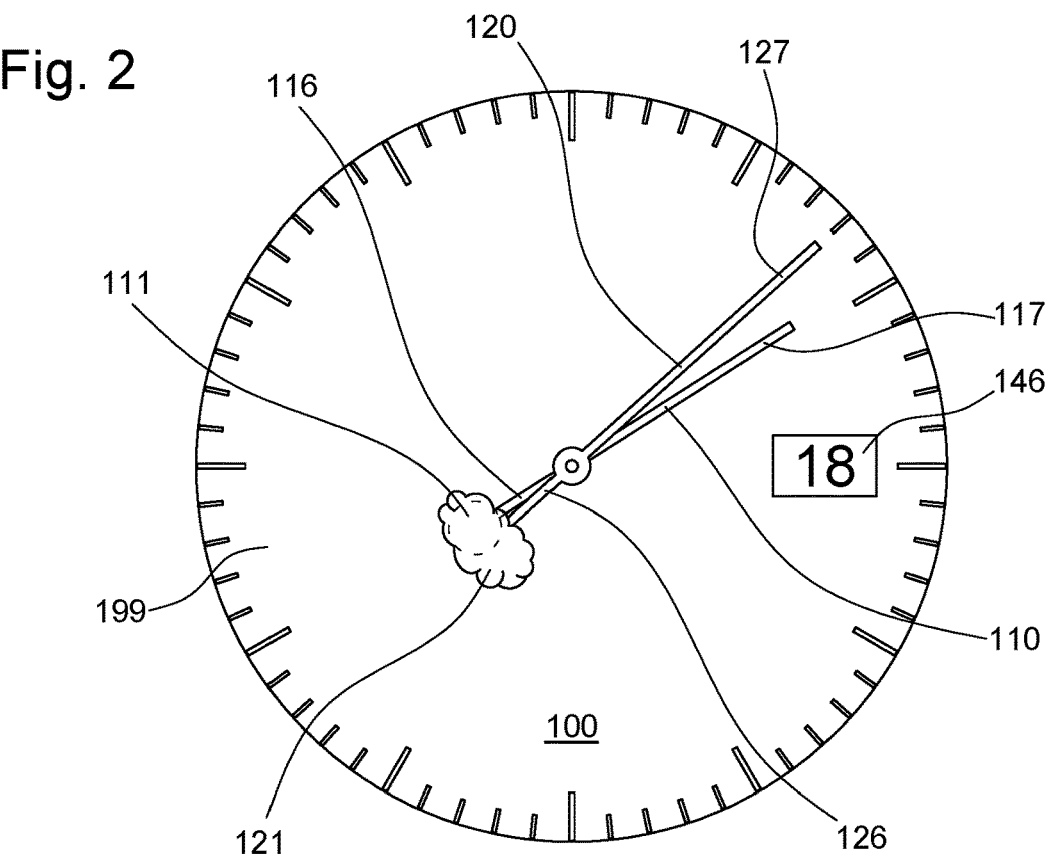

Said at least one first indicator member 110, preferably being movably mounted, includes at least one representation of the sun 111 for example and said at least one second indicator member 120, preferably being movably mounted, includes at least one concealing element 121 configured to conceal said at least one representation of the sun 111, as visible in FIG. 2.

Said at least one first carrier can be configured to drive said at least one first indicator member 110 and/or said at least one second indicator member 120 and be controlled by said at least one control unit at the request of the user. According to one embodiment, said display device 100 can comprise at least one second carrier configured to drive said at least one second indicator member 120, so that said at least one first carrier and said at least one second carrier can move said at least one first indicator member 110 and said at least one second indicator member 120 independently.

Moreover, as mentioned above, said at least one first indicator member 110, typically the hour hand or the minute hand, can be mobile about a first axis of rotation and can comprise a first proximal end 116 close to said first axis of rotation and/or a first distal end 117 distant from said first axis of rotation and said at least one second indicator member 120, conventionally the minute hand or the hour hand respectively, can be mobile about a second axis of rotation and can comprise a second proximal end 126 close to said second axis of rotation and/or a second distal end 127 distant from said second axis of rotation. In the various FIGS. 1 to 3, said at least one representation of the sun 111 is located on said first proximal end 116 and said at least one concealing element 121 is located on said second proximal end 126 for example, and it is totally possible for said at least one representation of the sun 111 and said at least one concealing element 121 to be located on said first distal end 117 and said second distal end 127, respectively, so that the weather forecasts can be represented at the end of said or at the ends of said at least one first indicator member 110 and/or at least one second indicator member 120, without a space on the dial 199 being specially dedicated to them, while using elements already present.

Figure 5:
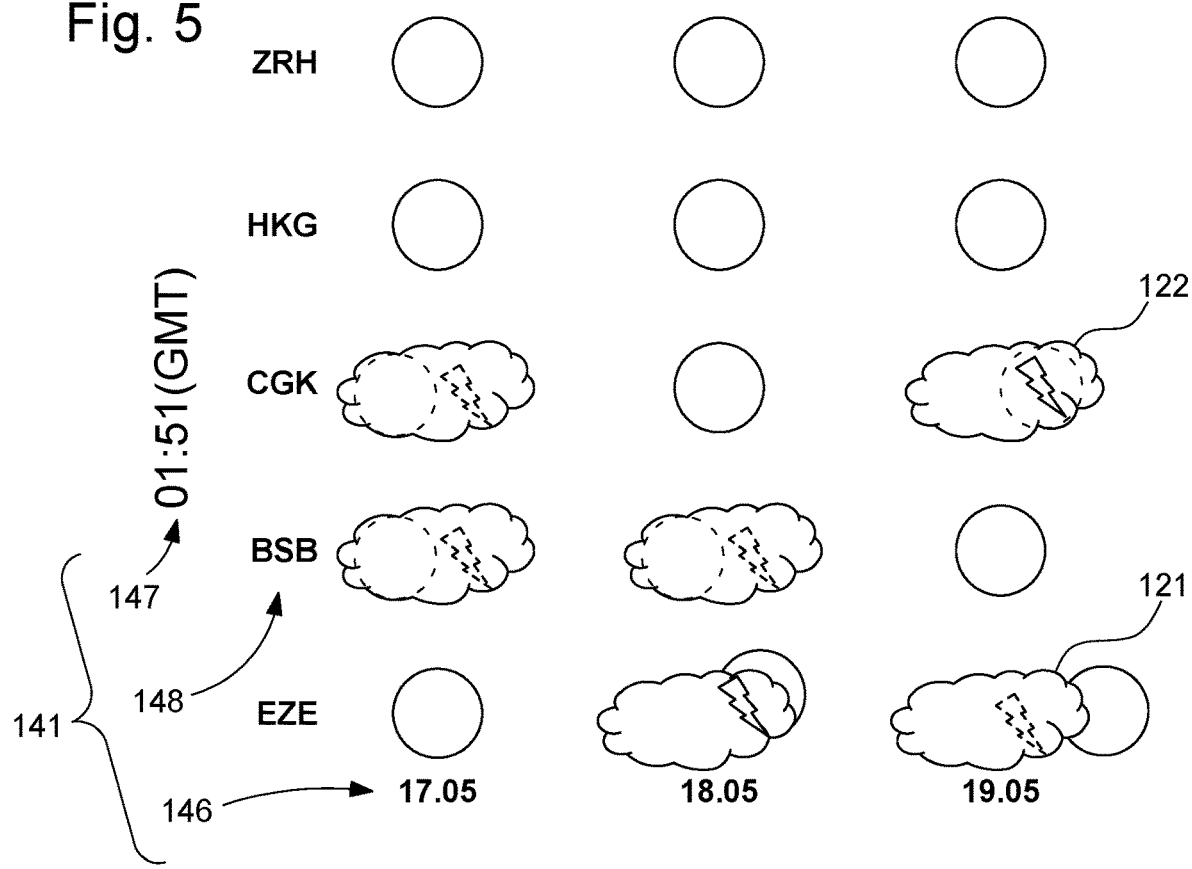
FIGS. 5-7 show daily or hourly weather forecasts.
Figure 6:
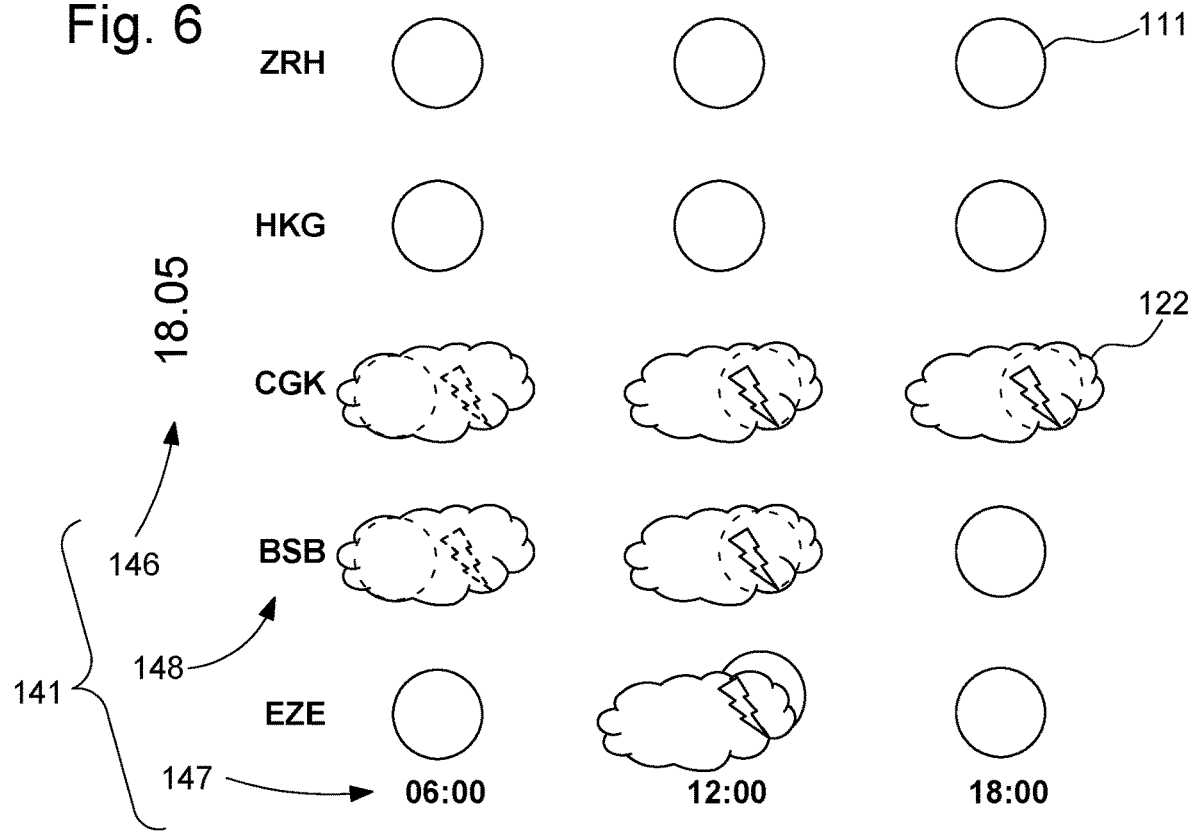
Figure 7:
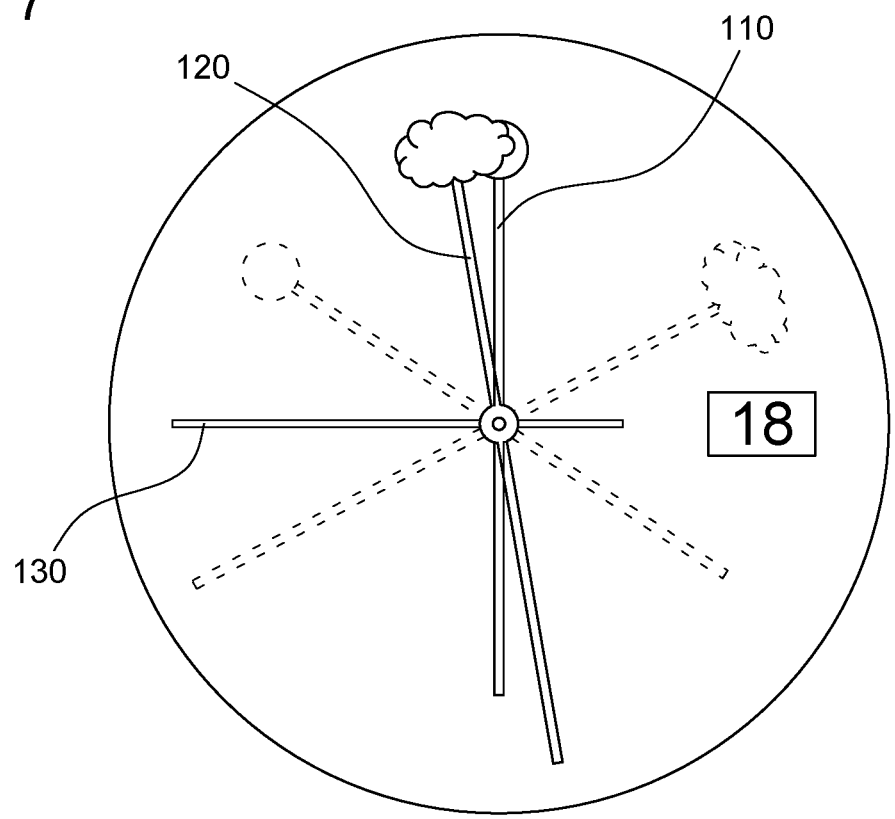

As for said at least one control unit, it can be configured to control, according to a set of data 141, as visible in FIGS. 5-7, said at least one first carrier so as to drive and/or to superimpose said at least one first indicator member 110 and/or said at least one second indicator member 120 in such a way that said at least one representation of the sun 111 is totally or partially concealed by said at least one concealing element 121, and thus that the weather forecasts are represented without a space on the dial 199 being specially dedicated to them, and moreover, the display device 100 allows the user to have a dynamic representation of the weather and in the most accurate manner.

Indeed, said set of data 141, represented in FIGS. 5 and 6, that said at least one control unit can receive can include at least one piece of weather data 145, at least one date 146, at least one time 147 and/or at least one geographic position 148 in order for the weather forecasts to be able to be represented to the user in the most accurate manner according to a moment and/or a location requested, daily and/or hourly.

Moreover, said set of data 141 can be received by said at least one control unit via radio frequencies, via a global positioning system, and/or via wired and/or optical communication.

Moreover, said set of data 141 can be used by a method 500 for displaying at least one weather forecast implemented by said at least one control unit. Indeed, said display method 500 can use said set of data 141 in order to allow the control of said at least one first carrier and/or of said at least one second carrier by said at least one control unit and the driving of said at least one first indicator member 110 and/or of said at least one second indicator member 120 so as to display a weather forecast as shown in FIG. 7.

Indeed, once said set of data 141 has been received, said at least one control unit actuates said at least one first carrier and/or said at least one second carrier so that said at least one first indicator member 110 and/or said at least one second indicator member 120 move according to said set of data 141. From then on, said at least one first indicator member 110 and/or said at least one second indicator member 120 which indicated the time move to indicate the weather according to said at least one time 147. For example, if the morning is sunny, said at least one representation of the sun 111 is placed between 9 o'clock and 11 o'clock for example, and if the afternoon is cloudy said at least one representation of the sun 111 is placed between 3 o'clock and 9 o'clock and said at least one concealing element 121 is placed between 1 o'clock and 3 o'clock for example. If the day is cloudy said at least one representation of the sun 111 and said at least one concealing element 121 are placed at 12 o'clock, as shown in FIG. 7.

To do this, said at least one first carrier can drive said at least one first indicator member 110 totally or partially below said at least one second indicator member 120 in such a way that said at least one representation of the sun 111 is totally or partially concealed by said at least one concealing element 121, or to drive said at least one second indicator member 120 totally or partially above said at least one first indicator member 110 in such a way that said at least one representation of the sun 111 is totally or partially concealed by said at least one concealing element 121.

The applicant has also provided for the display device to be able to comprise an aperture configured to indicate said current date 146 and/or said date of the weather indicated when the user requests it, as shown in FIG. 3. According to a similar embodiment, said current date 146 and/or said date of the weather can be indicated when the user requests it. Said display method 500 can also comprise at least one incrementation of said date 146 after each said at least one control and driving so as to display an hourly, daily, and/or weekly weather forecast.

As shown in FIG. 1 for example, said at least one representation of the sun 111, with a shape that is rounded, round, elliptical, a disc and/or spherical for example, can be lighter and/or substantially more reflective than said at least one concealing element 121, which can represent a cloud for example. According to other embodiments, it can also be possible to provide for said at least one concealing element 121 to be made from a material more photoabsorbent than said at least one representation of the sun 111.

Moreover, said at least one representation of the sun 111 can comprise a material made of gold and/or coppery for example, in order to represent the sun, and on the other hand, said at least one concealing element 121 can be made of silver, of titanium, of aluminium, of steel, of brass and/or of platinum for example. A coating, like a layer deposited by physical, chemical, galvanic means or manual depositing like a lacquer or a varnish can allow to adjust the colour and the appearance of the indicators.

Said display device 100 for a timepiece, preferably a watch, can also indicate the elevation of the sun and/or the position of the sun with respect to the horizon via said at least one first indicator member 110 and the second hand 130, which can indicate the line of the horizon and be driven by said at least one first carrier said at least one second carrier and/or at least one third carrier, in order for the user to know the position of the sun in the sky.

Finally, when the sky is cloudy, that is to say without visibility of the sky and of the sun, said at least one first indicator member 110 can be configured to indicate the position of the sun with respect to the cardinal points for example.

The invention claimed is:

1. A display device for a timepiece, said display device comprising:
    a first indicator member being movably mounted, wherein the first indicator is an hour hand or a minute hand having a representation of a sun on one end thereof;
    a second indicator member being movably mounted and including at least one concealing element configured to conceal the representation of the sun;
    a first carrier configured to drive said at least one of the first indicator member and said second indicator member; and
    control circuitry configured to control, according to a set of data, said first carrier so as to drive and/or superimpose said first indicator member and/or said second indicator member in such a way that the representation of the sun is totally or partly concealed by said at least one concealing element.

2. The display device according to claim 1, wherein the control circuitry is further configured to control said first carrier in response to a request of a user.

3. The display device according to claim 1, wherein said set of data includes a piece of weather data, a date, a time, and/or a geographic position.

4. The display device according to claim 1, wherein said set of data is received by said control circuitry via radio frequencies, via a global positioning system, and/or via wired and/or optical communication.

5. The display device according to claim 1, further comprising a second carrier configured to drive said second indicator member.

6. The display device according to claim 1, wherein said at least one concealing element comprises at least one opening in a shape of a lightning bolt, configured to let the representation of the sun partially appear.

7. The display device according to claim 1, wherein said first indicator member is configured to indicate a position of the sun with respect to an horizon.

8. The display device according to claim 1, wherein said first indicator member is configured to indicate a position of the sun with respect to cardinal points.

9. The display device according to claim 1, further comprising a second hand indicating a line of an horizon and being driven by said first carrier, a second carrier, and/or a third carrier.

10. A display device according to claim 1, wherein said second indicator member is the minute hand or the hour hand.

11. A method for displaying at least one weather forecast implemented by the display device according to claim 1 after reception of the set of data, said display method comprising at least one of:
controlling the first carrier, a second carrier, and/or a third carrier by the control circuitry; and
driving said first indicator member and/or said second indicator member so as to display a weather forecast.

12. The method according to claim 11, further comprising incrementing a date after each of the at least one of controlling and driving so as to display an hourly, daily, and/or weekly weather forecast.

13. The display device of claim 1, wherein the timepiece includes a dial, and the device is configured to represent a weather forecast without a space on the dial being dedicated to a symbol indicating the weather forecast.

14. A display device for a timepiece, said display device comprising:
a first indicator member being movably mounted and including a representation of a sun;
a second indicator member being movably mounted and including a concealing element configured to conceal the representation of the sun;
a first carrier configured to drive one of the first indicator member and the second indicator member; and
control circuitry configured to control, according to a set of data, the first carrier so as to drive and/or superimpose the first indicator member and/or the second indicator member in such a way that the representation of the sun is totally or partly concealed by the at least one concealing element,
wherein the display device further comprises a second hand indicating a line of an horizon and being driven by the first carrier, a second carrier, and/or a third carrier.

* * * * *